United States Patent Office 2,761,887
Patented Sept. 4, 1956

2,761,887

REFINING SULFURIC ACID TREATED AROMATIC HYDROCARBONS BY NEUTRALIZING IN TWO STAGES, WITH SUFFICIENT ALKALI METAL HYDROXIDE ADDED IN THE FIRST STAGE TO FORM AN AQUEOUS LAYER OF ACID NORMALITY BETWEEN 0.7 AND 2.2

Otto Schwarzkopf, Middle Village, and Jacob Jean Rascovski, Jackson Heights, N. Y., assignors to Oil & Chemical Products, Inc., New York, N. Y., a corporation of New York No Drawing. Application January 21, 1953,
Serial No. 332,538

12 Claims. (Cl. 260—674)

This invention relates to an improved process for refining aromatic hydrocarbons. More especially, our present invention deals with a process wherein sulfuric acid-treated crude aromatic hydrocarbons are mixed with an amount of aqueous alkali metal hydroxide considerably less than that required for neutralization, the resulting acid aqueous layer containing a minimum of aromatic material and substantially all of the sulfuric acid and sulfonic acids originally present in the sulfuric acid-treated crude aromatic hydrocarbons in the form of alkali metal sulfate and alkali metal sulfonate, and the resulting acid aromatic layer containing substantially all of the sulfur dioxide originally present in the crude aromatic hydrocarbons, which sulfur dioxide is subsequently recovered by neutralization of the aromatic layer.

An object of this invention is to provide an improved process for refining sulfuric acid-treated crude aromatic hydrocarbons wherein substantial economies in the amount of alkali metal hydroxide employed can be effected.

A further object of this invention is to provide a process of the type indicated wherein the sulfonic acids present in the acid treated crude hydrocarbons can be separated in a manner technically simple and in a form commercially useful.

A still further object of this invention is to provide a process wherein the losses of desired aromatics are reduced materially as compared with those which result from known processes.

Another object herein is to provide a refining process of the type mentioned in which the formation of emulsions is avoided.

Other objects will become apparent from the following detailed description.

Crude aromatic hydrocarbons, such as those used in this process are obtained industrially in various ways from coal. From the great literature on this subject, we are citing here two monographs:

1. "Coal, Coke and Coal Chemicals" by Philip J. Wilson and Joseph H. Wells.
2. "Motor Benzol, its Production and Use" by W. H. Hoffert and C. Claxton, London, 1938.

Recently aromatics have also been prepared from petroleum and there is a very substantial literature on this subject.

In all these mentioned processes, the aromatic hydrocarbons are obtained in crude form containing a great number of impurities. Some of the impurities are saturated aliphatics, or paraffins; others are unsaturated aliphatics, olefins; still others are cycloaliphatics, saturated, such as cyclohexane or unsaturated, such as cyclopentadienes or methyl-cyclopentadiene; others are hetero-cyclic compounds such as thiophene or methyl-thiophene.

In order to eliminate the unsaturated impurities and the thiophenes, the crude aromatic hydrocarbons are refined prior to use.

The treatment of these crude hydrocarbons is normally effected with sulfuric acid. Usually a concentrated sulfuric acid of 96 to 100% $H_2SO_4$ is employed although in some cases sulfuric acid of as low as 90% $H_2SO_4$ strength has been used. The reaction is effected by intensive mixing either by batch or continuous operation techniques.

After mixing is completed the acid is allowed to separate as a thick brown sludge containing up to 40% of its weight of organic material. This sludge settles at the bottom of the reactor or in a separate settling tank and is withdrawn. What is left is a mixture of hydrocarbons which contains sulfuric acid, sulfur dioxide and other acidic products such as sulfonic acids. These hydrocarbons are referred to herein as sulfuric acid-treated crude aromatic hydrocarbons, and may be employed in accordance with our process.

In a variation of the above process, the crude aromatic hydrocarbons may first be fractionated by fractional distillation into crude aromatic hydrocarbon fractions, such as a fraction having a boiling range from 79–100° C. which we will call crude benzene cut, a fraction having a boiling range from 105–120° C. which we will call crude toluene cut, and a fraction having a boiling range from 137–155° C. which we will call crude xylene cut. It is sometimes also the practice to separate the crude aromatic hydrocarbons only into 2 fractions, namely crude benzol cut as defined above and a fraction boiling from 105–155° C., which we will call the crude toluene-xylene cut. The fractions so obtained are individually refined by treatment with sulfuric acid. After settling of the acid sludge, there is obtained what we will call the acid-treated aromatic hydrocarbon "cuts." These acid treated fractions are used in our process.

The aforesaid sulfuric acid-treated crude hydrocarbons or hydrocarbon cuts are normally treated with an excess of aqueous alkali. The resulting alkaline aqueous layer contains the salts of all of the acids originally present in the crude. After the aqueous alkaline layer is withdrawn, the aromatic layer is usually water washed, and then either fractionally distilled or flash distilled when hydrocarbon cuts were used.

This known method of refining has serious disadvantages. For one thing, the sulfonates and sulfates are obtained in such dilute form in the aqueous layer that their recovery and utility are not commercially feasible. Further, because of the wetting properties of the aforesaid sulfonates it has been found necessary to wash the acid-treated hydrocarbons with 4 to 5 times the theoretical amount of alkali metal hydroxide necessary for neutralization purposes in order to avoid the formation of emulsions and the losses of valuable hydrocarbons. This large excess of alkali metal hydroxide has added considerably to the cost of known refining processes. Then again, even if emulsions are avoided and a completely clear and transparent aqueous alkaline solution is obtained, such a solution contains up to 10–12% of aromatics. This high aromatics content is believed to be caused by the presence of the highly surface-active sulfonates, which by the formation of micelles render the otherwise water-insoluble aromatics quite soluble in the aqueous alkaline layer. A fourth disadvantage of known refining processes is the fact that the aqueous alkaline layer contains sulfites and other salts. These sulfites are a present economic waste and represent a disagreeable waste removal problem when acidified, due to the evolution of sulfur dioxide gas.

We have found that the above-mentioned objects can be attained without the disadvantages of known processes by our present invention. In general, our novel process involves the intimate mixing of sufficient aqueous alkali metal hydroxide with the acid-treated crude hydrocarbon material so that the resulting aqueous layer has an acid normality within the range of about 0.7 N to 2.2 N and a volume of about 1 to 4 per cent as compared with the resulting aromatics layer. We have found that the desired results are obtained when 1 N to 3 N aqueous alkali metal hydroxide is employed.

For especially advantageous results we prefer to employ aqueous alkali metal hydroxide of about 1.3 N to 2.0 N and to add sufficient thereof to the crude acid treated aromatic hydrocarbons so as to result in an aqueous phase having a volume of about 2 to 3 per cent that of the resulting aromatics phase and an acid normality of about 1.0 N to 1.5 N.

While we may employ potassium hydroxide as an alkali metal hydroxide we prefer to employ sodium hydroxide.

Our process can be conveniently divided into two steps. Step one involves the treatment of the crude acid-treated aromatics with aqueous alkali metal hydroxide, in quantities as described above insufficient for neutralization, so as to form 2 phases, an aqueous acid phase and an aromatic phase. The aqueous acid layer is neutralized and is used for the commercial recovery of sulfonates. The aromatic layer is subjected to step two of our process. It involves neutralization of the aromatics with equivalent or excess caustic and separation of the sulfite solution so formed from the aromatics.

We have found that best results are obtained by causing intimate mixing of the materials. While the temperature may be varied over wide limits we prefer to conduct our process within the range of about 10° C. to 50° C. Higher temperatures are not recommended because of the vapor pressure of the crude aromatic hydrocarbons. Normal temperatures between 10-35° C. give advantageous results.

For the separation in solid form of the alkali-salt of the sulfonates, the neutralized aqueous solution of step one can be either spray or drum dried by known procedures. The solid so obtained will contain 40-60% of sulfonates besides 60-40% of inorganic salts, mainly sodium sulfate. This mixture constitutes a commercial product. It can also be used for the separation by known methods of the sulfonates from the salt if salt free sulfonates are desired. It is also possible to decolorize the neutral aqueous solution of step one, by known methods, prior to the drying.

While we have found that step two can be efficiently conducted by employing enough alkali metal hydroxide required for neutralization purposes, we nevertheless have found it convenient to employ an excess of alkali metal hydroxide up to about 20%. The caustic and aromatics are intimately mixed then separated by settling.

In order to eliminate all losses of aromatics, the amount of these materials which are solubilized in the aqueous layer in step one can be recovered, without affecting the utility of the sulfonates. This can be done e. g. by neutralizing the aqueous layer with strong alkali metal hydroxide and removing the aromatics therein by the use of superheated steam. The aqueous layer from step two does not contain any aromatics.

In order to describe our invention more fully the following examples are given. It is understood that they are for purposes of illustration and not limitation.

EXAMPLE 1

*Refining of crude motor benzol*

The starting material for this example is motor benzol. Motor benzol conforms to the following specifications:

Specific gravity, 0.87–0.886.
Distilling range:
    At least 60% at 100° C.
    At least 95% at 155° C.
    Endpoint 160° C.
Acid wash color, beyond standards.

A steel agitator of 10,000 gallons capacity, leadlined and equipped with a centrifugal impeller, an acid meter tank, a caustic meter tank, a bottom valve, a 3-way spout and connected by pipes to the storage tanks, is used in this operation.

4100 gallons of crude motor benzol was treated in the agitator with 125 gallons of 98% sulfuric acid under violent agitation for 30 minutes. A heavy acid sludge formed and was allowed to settle. After one hour 190 gallons of sludge were withdrawn through the bottom discharge valve and the three-way spout and discarded. Stirring was then resumed for ten minutes and an additional settling time of our hour followed. 10 more gallons of sludge settled and were withdrawn and discarded. The acid-treated aromatics had a volume of 4000 gallons.

STEP 1

Now, following the procedure of our invention, 60 gallons of 9° Baumé caustic (66 g. NaOH/liter) were added to the foregoing acid-treated aromatics. After a quick mixing for 5 minutes, the liquids were allowed to settle. We observed a very rapid and complete separation of the two phases. There was no intermediary layer or emulsion. After one hour settling, the lower aqueous acid layer was withdrawn through the bottom discharge valve and the 3-way spout and collected in a jacketed glasslined still. Its volume was 100 gallons. The acidity of the solution was 1.2 N.

It was neutralized by the addition of 6.4 gallons of a 50° Baumé sodium hydroxide (760 g./liter). A total of 18.30 Kg. NaOH were required for neutralization. The total volume now was 107 gallons. The pH was 7–8. This solution was now heated with low pressure indirect steam and the solubilized aromatics together with some water were distilled off. Distillation started at the boiling point of the benzol-water azeotrope at 61° C. and was complete at 100° C. When this distilling temperature was reached, heating was stopped. The distillate besides 10 gallons of water amounted to 20 gallons of aromatics. The volume of the sulfonate solution was 78 gallons.

This solution was dried in a Buflovak atmospheric pressure double drum dryer. There were obtained 230 lbs. of solids. The analysis showed the following composition:

51% sodium sulfonate
49% inorganic salts, mainly sodium sulfate.

The color of the material was yellow. The surface activity of this material was tested using a Du Nouy interfacial tensionmeter.

| Concentr., percent | 1 | 0.5 | 0.05 | 0.025 |
|---|---|---|---|---|
| Surface tension—Dynes/cm. 25°C | 33.6 | 33.9 | 33.8 | 36.9 |

In order to determine the composition of the sulfonates, the sulfonate-salt mixture was extracted with anhydrous methanol. After evaporation of the methanol, the residue was analyzed. It was found to correspond to $C_{11-12}H_{13-15}SO_3Na$.

STEP 2

The aromatic phase was now neutralized in the agitator by the addition of 50 gallons of 9° Baumé caustic, enough to completely neutralize the aromatic phase. After thorough mixing for 20 minutes the two phases were allowed to settle for one hour. After this time the pH was measured. The aromatic phase had a pH of 7.5. The aqueous phase had a pH of 8.0. The aqueous phase was withdrawn. It had a volume of 50 gallons and contained 75 g. sodium sulfite per liter. This solution was collected. It can be sold as such or evaporated to obtain sodium sulfite.

The aromatic phase to which 20 gallons obtained in step 1 were added, total volume 3980 gallons, was introduced into a series of fractionating columns where it was separated into industrial grade benzol, toluol and xylol.

All these products corresponded to the ASTM specifications.

The yields were as follows:

| | |
|---|---|
| Benzol | gallons__ 3255 |
| Toluol | do____ 437 |
| Xylol | do____ 198 |
| Higher boiling fractions | do____ 60 |
| Losses of refining | percent__ 3.66 |

When the same starting material was treated according to known procedures, the following results were obtained:

4100 gallons of crude aromatics were treated with 125 gallons of 98% sulfuric acid. After settling of 200 gallons of sludge 4000 gallons of acid treated aromatics were measured.

4000 gallons were neutralized with 400 gallons of 13° Baumé caustic by mixing for 10 minutes and settling for one hour. We obtained 445 gallons of a clear aqueous layer which was discarded. The aromatic phase had a volume of 3920 gallons as compared to 3970 gallons according to our invention. On distillation there was obtained 3,213 gallons benzol, 431 gallons toluol, 196 gallons xylol, 60 gallons higher fractions.

A comparison of the two procedures is given in the table below:

| | Our procedure | Known procedure |
|---|---|---|
| Crude aromatics used_____gals__ | 4,100 | 4,100 |
| caustic used: | | |
| (Step 1)_____lbs__ | 73.34 | |
| (Step 2)_____lbs__ | 27.50 | |
| total_____lbs__ | 100.84 | 267.50 |
| sulfonates 100% obtained_____lbs__ | 117 | |
| benzol obtained_____gals__ | 3,255 | 3,213 |
| sulfite obtained_____lbs__ | 33 | |
| toluol obtained_____gals__ | 437 | 431 |
| xylol obtained_____gals__ | 198 | 196 |
| higher fractions_____gals__ | 60 | 60 |
| total aromatics_____gals__ | 3,950 | 3,900 |
| losses in aromatics during refining____percent__ | 3.66 | 4.88 |

The above example shows an economy of 166.7 lbs. of caustic (62%), an increase of 50 gallons of aromatics (1.2%) and allows the separation of 117 lbs. of sulfonates and 33 lbs. of sodium sulfite in commercially useful form.

EXAMPLE 2

In this variant the crude aromatics prior to their refining are fractioned into cuts: 10,00 gallons of crude aromatics are fractionally distilled through a series of fractionating columns.

In the first column the benzol fraction is taken overhead. The top temperature of the column is held at 100° C. The bottoms of the first column are fed into the second column the top temperature of which is maintained at 120° C. The bottoms of the second column are fed into the third column where the xylenes are distilled off. In order to lower the boiling point, some steam is introduced in the third column, the bottom of column 3 is introduced with steam into column 4 where the higher boiling fractions are separated. The endpoint of these fractions distilled under normal pressure is 325° C.

The operations outlined above are done according to known distillation techniques and are not part of this invention.

We obtained the following fractions:

| | |
|---|---|
| Benzol cut | gallons__ 8200 |
| Toluene cut | do____ 1100 |
| Xylene cut | do____ 500 |
| High boiling cut | do____ 150 |

The loss of distillation was 50 gallons.

*Refining of the benzol cut*

8200 gallons of the foregoing benzol cut were refined with 250 gallons of 100% sulfuric acid by mixing and settling as described in Example 1.

8100 gallons of acid treated benzol was obtained.

In step 1 120 gallons of 9° Baumé caustic were used. The aqueous layer containing the sulfonic acids had a volume of 200 gallons. The acidity was 0.9 normal. For the neutralization 9.6 gallons of 50° Beaumé caustic soda was added. The final volume was 208 gallons. The pH of the aqueous solution was 8.2. The pH of the benzene was 8.

On distillation 20 gallons of benzol were recovered. The volume of the sulfonate solution was 178 gallons. On evaporation and drying 440 lbs. of solids were obtained. The analysis gave 49% sulfonate 51% salts. The sulfonates corresponded to the empirical formula:

$$C_{12}H_{13}SO_3Na$$

The benzol was redistilled without fractionation.

Including the recovered 20 gallons we obtained 7970 gallons of benzol.

*Refining of the toluene and xylene cuts*

Similarly, the toluene cut and the xylene cut were refined. However, 92% sulfuric acid was used for the refining. Step 1 and step 2 were carried out as outlined above. We obtained 1065 gallons of toluene and 483 gallons of xylene. The higher boiling fractions were 140 gallons.

The overall economy on alkali was 72%.
The losses on aromatics were 3.42%.

The foregoing illustrates the practice of this invention, which, however, is not to be limited thereby but is to be construed as broadly as permissible in view of the prior art and limited solely by the appended claims.

We claim:

1. The process for refining aromatic hydrocarbons, which comprises mixing sulfuric acid-treated crude aromatic hydrocarbons with aqueous alkali metal hydroxide in sufficient quantity that the resulting aqueous layer has an acid normality within the range of about 0.7 to 2.2 N, and separating said aqueous layer, which contains substantially all of the sulfuric acid and sulfonic acids originally present in said sulfuric acid-treated crude aromatic hydrocarbons in the form of alkali metal sulfate and alkali metal sulfonate, from the resulting aromatics layer which contains substantially all of the $SO_2$ originally present in said sulfuric acid-treated crude aromatic hydrocarbons.

2. The process which comprises adding sufficient alkali metal hydroxide to the resulting aromatic layer produced in accordance with claim 1 to raise the pH to at least 7, and separating the resulting two layers.

3. The process of claim 2 wherein the sulfuric acid-treated crude aromatic hydrocarbon employed is a mixture comprising a preponderant amount of benzene and a minor amount of toluene and xylenes.

4. The process of claim 2 wherein the sulfuric acid-treated crude aromatic hydrocarbon employed is benzene.

5. The process for refining aromatic hydrocarbons, which comprises mixing sulfuric acid-treated crude aromatic hydrocarbon with aqueous alkali metal hydroxide in sufficent quantity that the resulting aqueous layer has an acid normality within the range of about 0.7 N to 2.2 N and a volume of about 1 to 4 per cent by volume as compared with the resulting aromatics layer, and separating said aqueous layer, which contains substantially all of the sulfuric acid and sulfonic acids originally present in said sulfuric acid-treated crude aromatic hydrocarbons in the form of alkali metal sulfate and alkali metal sulfonate, from the resulting aromatics layer which contains substantially all of the $SO_2$ originally present in said sulfuric acid-treated crude aromatic hydrocarbons.

6. The process which comprises adding sufficient alkali metal hydroxide to the resulting aromatic layer produced in accordance with claim 5 to raise the pH to at least 7, and separating the resulting two layers.

7. The process of claim 6, wherein the sulfuric acid-treated crude aromatic hydrocarbon employed is a mixture comprising a preponderant amount of benzene and a minor amount of toluene and xylenes.

8. The process of claim 6, wherein the sulfuric acid-treated crude aromatic hydrocarbon employed is benzene.

9. The process for refining aromatic hydrocarbons, which comprises mixing sulfuric acid-treated crude aromatic hydrocarbon with aqueous 1 N to 3 N alkali metal hydroxide in sufficient quantity that the resulting aqueous layer has an acid normality within the range of about 0.7 N to 2.2 N and a volume of about 1 to 4 per cent by volume as compared with the resulting aromatics layer, and separating said aqueous layer, which contains substantially all of the sulfuric acid and sulfonic acids originally present in said sulfuric acid-treated crude aromatic hydrocarbons in the form of alkali metal sulfate and alkali metal sulfonate, from the resulting aromatics layer which contains substantially all of the $SO_2$ originally present in said sulfuric acid-treated crude aromatic hydrocarbons.

10. The process which comprises adding sufficient alkali metal hydroxide to the resulting aromatic layer produced in accordance with claim 9 to raise the pH to at least 7, and separating the resulting two layers.

11. The process of claim 10, wherein the sulfuric acid-treated crude armoatic hydrocarbon employed is a mixture comprising a preponderant amount of benzene and a minor amount of toluene and xylenes.

12. The process of claim 10, wherein the sulfuric acid-treated crude aromatic hydrocarbon employed is benzene.

References Cited in the file of this patent

UNITED STATES PATENTS

| | | |
|---|---|---|
| 1,859,262 | Shaw | May 17, 1932 |
| 1,984,432 | Robinson | Dec. 18, 1934 |
| 2,022,358 | McKay | Nov. 26, 1935 |